US011564260B2

(12) United States Patent
Golitschek Edler von Elbwart et al.

(10) Patent No.: US 11,564,260 B2
(45) Date of Patent: Jan. 24, 2023

(54) CONTENTION WINDOW ADJUSTMENT

(71) Applicant: LENOVO (BEIJING) LIMITED, Beijing (CN)

(72) Inventors: Alexander Johann Maria Golitschek Edler von Elbwart, Darmstadt (DE); Haipeng Lei, Beijing (CN); Prateek Basu Mallick, Langen (DE); Joachim Löhr, Wiesbaden (DE)

(73) Assignee: LENOVO (BEIJING) LIMITED, Beijing (CN)

( * ) Notice: Subject to any disclaimer, the term of this patent is extended or adjusted under 35 U.S.C. 154(b) by 35 days.

(21) Appl. No.: 17/267,324

(22) PCT Filed: Aug. 9, 2018

(86) PCT No.: PCT/CN2018/099682
§ 371 (c)(1),
(2) Date: Feb. 9, 2021

(87) PCT Pub. No.: WO2020/029186
PCT Pub. Date: Feb. 13, 2020

(65) Prior Publication Data
US 2021/0235511 A1 Jul. 29, 2021

(51) Int. Cl.
*H04W 72/04* (2009.01)
*H04L 5/00* (2006.01)
(Continued)

(52) U.S. Cl.
CPC ......... *H04W 74/0833* (2013.01); *H04L 1/08* (2013.01); *H04L 69/28* (2013.01)

(58) Field of Classification Search
CPC .......... H04W 74/0833; H04W 74/085; H04W 74/004; H04L 1/1812; H04L 1/1825;
(Continued)

(56) References Cited

U.S. PATENT DOCUMENTS

| 2011/0116364 A1* | 5/2011 | Zhang | H04W 74/08 370/216 |
| 2014/0169290 A1* | 6/2014 | Seok | H04W 74/006 370/329 |

(Continued)

OTHER PUBLICATIONS

Huawei, HiSilicon "Contention Resolution for Random Access, R2-1710772", 3GPP TSG-RAN WG2 #99bis, Prague, Czech Republic, Oct. 9-13, 2017 (Year: 2017).*
(Continued)

*Primary Examiner* — Edan Orgad
*Assistant Examiner* — Vanneilian Lalchinthang
(74) *Attorney, Agent, or Firm* — Kunzler Bean & Adamson

(57) ABSTRACT

An apparatus comprises a transmitter for transmitting a first message to a communication device, where the first message is a message within a random access procedure; a receiver for receiving a second message from the communication device in response to the first message; and a processor that increases a contention window value if the second message is not received in a time duration after the first message is transmitted; and that sets the contention window value to an initial value if the second message is received in the time duration after the first message is transmitted.

13 Claims, 6 Drawing Sheets

(51) Int. Cl.
  *H04W 74/08* (2009.01)
  *H04L 1/08* (2006.01)
  *H04L 69/28* (2022.01)

(58) Field of Classification Search
  CPC . H04L 1/08; H04L 69/28; H04L 1/187; H04L 47/27; H04L 5/0055
  USPC .......................................................... 370/328
  See application file for complete search history.

(56) References Cited

U.S. PATENT DOCUMENTS

| | | | |
|---|---|---|---|
| 2016/0269303 A1* | 9/2016 | Park | H04W 74/085 |
| 2016/0338054 A1* | 11/2016 | Oh | H04W 74/0841 |
| 2017/0078052 A1* | 3/2017 | Matsuo | H04L 5/0037 |
| 2017/0079013 A1* | 3/2017 | Noh | H04L 1/187 |
| 2018/0084432 A1* | 3/2018 | Kwak | H04L 27/2613 |
| 2018/0167957 A1* | 6/2018 | Noh | H04L 27/2602 |
| 2019/0246412 A1* | 8/2019 | Noh | H04W 84/12 |
| 2020/0280859 A1* | 9/2020 | Kim | H04B 7/0695 |

OTHER PUBLICATIONS

3GPP, 3rd Generation Partnership Project; Technical Specification Group Radio Access Network; Contention resolution for random access 3GPP R2-1710772 Oct. 2017, pp. 1-4.

3GPP, 3rd Generation Partnership Project; Technical Specification Group Radio Access Network; Physical layer procedures for shared spectrum channel access (Release 15) 3GPP TS 37.213 V15.0.0 Jun. 2018, pp. 1-20.

International Searching Authority, "Notification of Transmittal of the International Search Report and the Written Opinion of the International Searching Authority, or the Declaration", PCT/CN2018/099682, dated Aug. 9, 2018, pp. 1-8.

* cited by examiner

CONTENTION WINDOW ADJUSTMENT

TECHNICAL FIELD

The present application generally relates to 3GPP 5G new radio (NR), especially for contention window adjustment in 3GPP network architecture.

BACKGROUND OF THE INVENTION

In the conventional contention window adjustment scenario, a New Data Indication (NDI) is included in a transmitted message. Thus, it can be determined, with the NDI, that whether the transmitted message is a re-transmitted message or not. If the message is indicated as a re-transmitted message, the contention window size may be increased, so as to avoid a collision; otherwise, the contention window size may remain unchanged.

For the Random Access Channel (RACH) procedure, the NDI is not included in the messages transmitted between the UE and the base unit. Thus, the RACH messages do not have any effect on the contention window size. This leads to unfair coexistence behavior with other transmission nodes belonging to the same or different radio access network using the unlicensed channel.

SUMMARY OF THE INVENTION

One embodiment of the present disclosure provides an apparatus comprising a transmitter for transmitting a first message to a communication device, where the first message is a message within a random access procedure; a receiver for receiving a second message from the communication device in response to the first message; and a processor that increases a contention window value if the second message is not received in a time duration after the first message is transmitted; and that sets the contention window value to an initial value if the second message is received in the time duration after the first message is transmitted.

Another embodiment of the present disclosure provides an apparatus comprising: a receiver for receiving a first message from a communication device, where the first message is a message within a random access procedure; a transmitter for transmitting a second message to the communication device in response to the first message; and a processor that keeps a contention window value unchanged or sets the contention window value to an initial value while a contention resolution of a random access procedure is ongoing.

Yet another embodiment of the present disclosure provides an apparatus comprising: a receiver for receiving a first message from a communication device, where the first message is a message within a random access procedure; a transmitter for transmitting a second message to the communication device in response to the first message; and a processor that increases a contention window value if the receiver receives a re-transmitted first message from the communication device.

Yet another embodiment of the present disclosure provides a method comprising: transmitting, by an apparatus, a first message to a communication device, where the first message is a message within a random access procedure; increasing a contention window value if a second message is not received from the communication device in response to the first message in a time duration after the first message is transmitted; and setting the contention window value to an initial value if the second message is received from the communication device in response to the first message in the time duration after the first message is transmitted.

Yet another embodiment of the present disclosure provides a method comprising: receiving, by an apparatus, a first message from a communication device, where the first message is a message within a random access procedure; transmitting, by the apparatus, a second message to the communication device in response to the first message; keeping a contention window value unchanged or setting the contention window value to an initial value while a contention resolution of a random access procedure is ongoing.

Yet another embodiment of the present disclosure provides a method, comprising: receiving, by an apparatus, a first message from a communication device, where the first message is a message within a random access procedure; transmitting, by the apparatus, a second message to the communication device in response to the first message; and increasing a contention window value if a re-transmitted first message is received from the communication device.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide the method and apparatus for contention window adjustment in the RACH procedure. To facilitate understanding, embodiments are provided under specific network architecture and new service scenarios, such as 3GPP 5G, 3GPP LTE Release 8 and onwards. Persons skilled in the art know well that, with developments of network architecture and new service scenarios, the embodiments in the subject disclosure are also applicable to similar technical problems.

Figure 1:
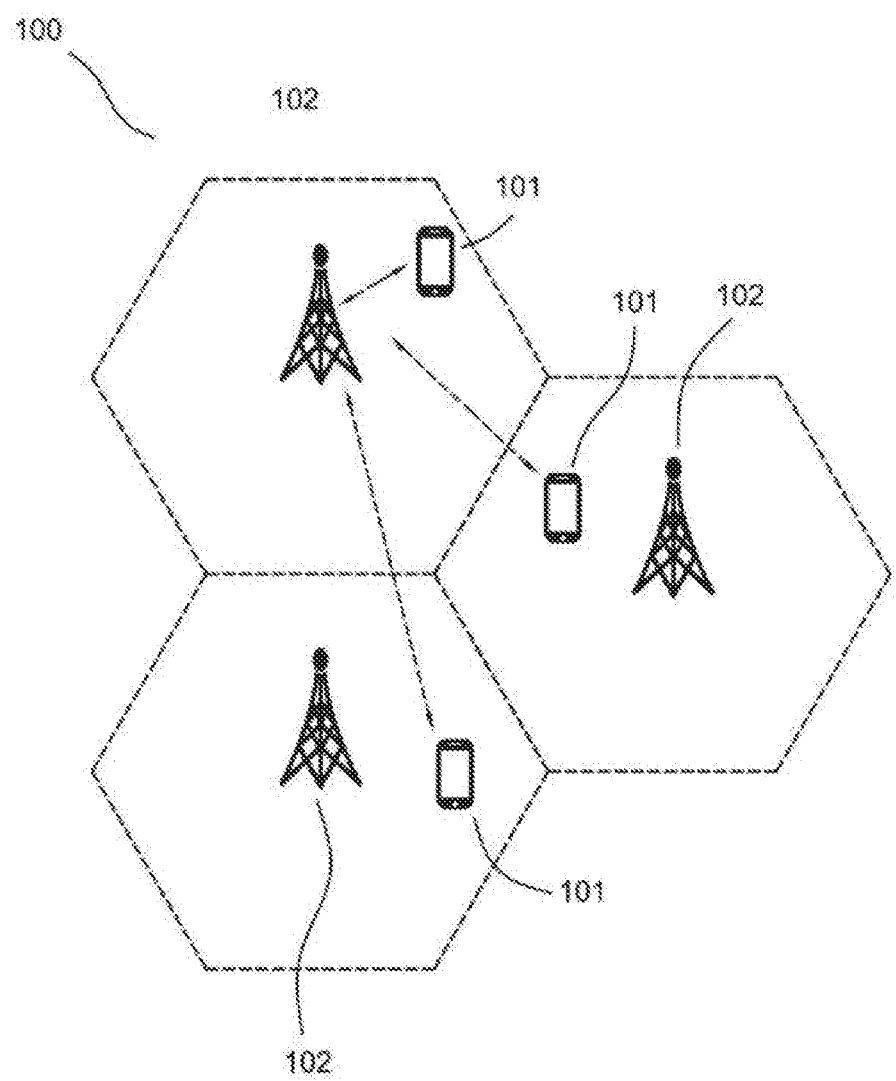
FIG. 1 illustrates an example block diagram of a wireless communication system according to an embodiment of the present disclosure.

FIG. 1 depicts a wireless communication system 100 according to an embodiment of the present disclosure.

As shown in FIG. 1, the wireless communication system 100 includes user equipment 101 and base units 102. Even though a specific number of user equipment 101 and base units 102 are depicted in FIG. 1, one of skill in the art will recognize that any number of user equipment 101 and base units 102 may be included in the wireless communication system 100.

The user equipment 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present disclosure, the user equipment 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the user equipment 101 includes wearable devices, such as smart watches, fitness bands, optical head-mounted displays, or the like. Moreover, the user equipment 101 may be referred to as subscriber units, mobiles, mobile stations, users, terminals, mobile terminals, wireless terminals, fixed terminals, subscriber stations, user equipment 101, user terminals, a device, or by other terminology used in the art. The user equipment 101 may communicate directly with a base unit 102 via UL communication signals.

The base units 102 may be distributed over a geographic region. In certain embodiments, a base unit 102 may also be referred to as an access point, an access terminal, a base, a base station, a macro cell, a Node-B, an enhanced Node B (eNB), a base units 102, a Home Node-B, a relay node, a device, or by any other terminology used in the art. The base units 102 are generally part of a radio access network that may include one or more controllers communicably coupled to one or more corresponding base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system 100 is compliant with 5G new radio (NR) of the 3GPP protocol, wherein the base unit 102 transmits using an orthogonal frequency division multiplexing (OFDM) modulation scheme on the DL and the user equipment 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In some embodiments, the base unit 102 may communicate using other communication protocols, such as the IEEE 802.11 family of wireless communication protocols. Further, in some embodiments the base unit 102 may communicate over licensed spectrum, while in other embodiments the base unit 102 may communicate over unlicensed spectrum. The present disclosure is not intended to be limited to the implementation of any particular wireless communication system architecture or protocol. In another embodiment, the base unit 102 may communicate with user equipment 101 using the 3GPP 5G protocols.

Figure 2:
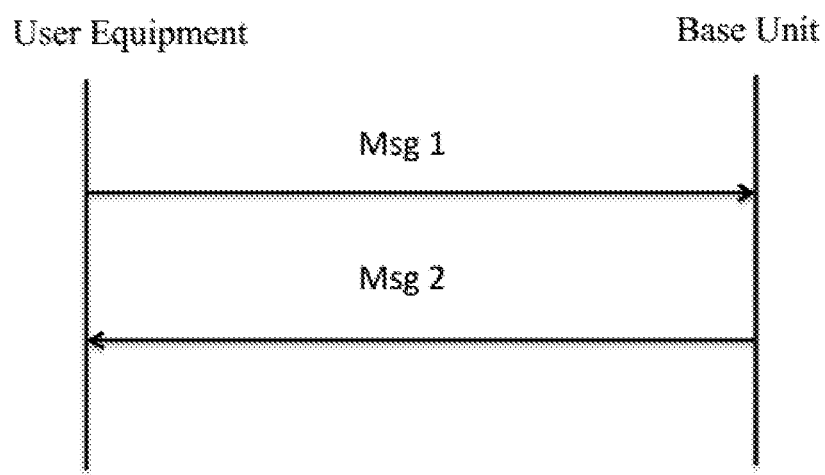
FIG. 2 illustrates a non-contention based random access procedure.

FIG. 2 illustrates a contention-free random access procedure. In this process, the US transmits Msg 1 (e.g. RACH preamble) to the base unit, where the UE uses a dedicated preamble. In response, the base unit sends Msg 2 (i.e. Random Access Response (RAR)), which includes UL grant (Random Access Response Grant), to the UE. Then, the RACH procedure ends. In other words, the next message transmitted by the UE to the base unit is not a part of the random access procedure.

Figure 3:
FIG. 3 illustrates a contention based random access procedure.
Figure 3:
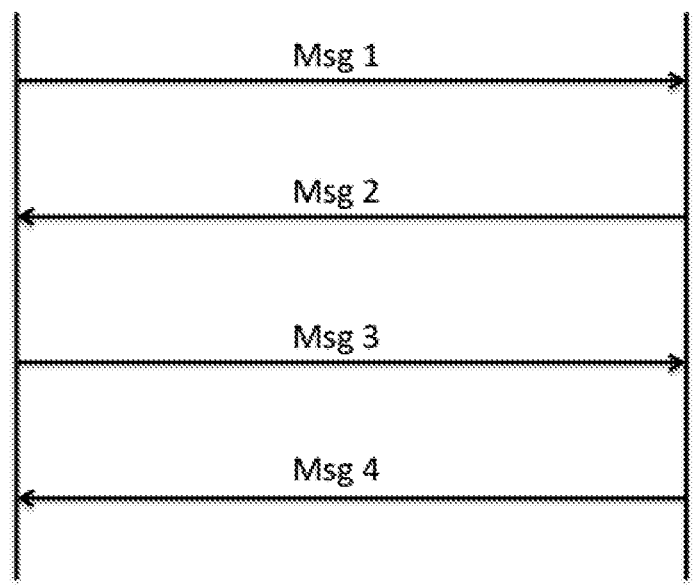

FIG. 3 illustrates a contention-based random access procedure. In this process, the UE transmits Msg 1 to the base unit as a RACH preamble, and then the base unit sends Msg 2 to the UE as a RAR. After receiving Msg 2, the UE transmits Msg 3 to the base unit, which includes the identification of the UE. The base unit then transmits Msg 4, which includes contention resolution, to the UE. Then, the RACH procedure ends.

Section 4.2.2 of TS 37.213v15.0.0 specifies a contention window adjustment procedure. It is described in section 4.2.2 that if the UE receives an Uplink (UL) grant or Autonomous UL Downlink feedback indication (AUL-DFI), the contention window size for all the priority classes is adjusted as follow:

If the NDI value for at least one HARQ process associated with HARQ_ID_ref is toggled, or if the HARQ-ACK value(s) for at least one of the HARQ processes associated with HARQ_ID_ref received in the earliest AUL-DFI after $n_{ref}+3$ indicates ACK.

For every priority class p∈{1, 2, 3, 4} set $CW_p = CW_{min,p}$

Otherwise, increase $CW_p$ for every priority class p∈{1, 2,3,4} to the next higher allowed value.

The next allowed value can be determined by Table 4.2.1-1 of TS 37.213 as follows:

TABLE 1

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps.
The minimum duration of a gap shall be 100 μs. The maximum duration before including any such gap shall be 6 ms.

Take channel access priority class 2 as an example. The minimum $CW_p$ is 7 and the allowed $CW_p$ is {7, 15}. Assuming the current $CW_p$ is 7, if the NDI as specified by the quoted section is toggled, the $CW_p$ remains unchanged; otherwise, $CW_p$ will be set to 15.

Figure 4:
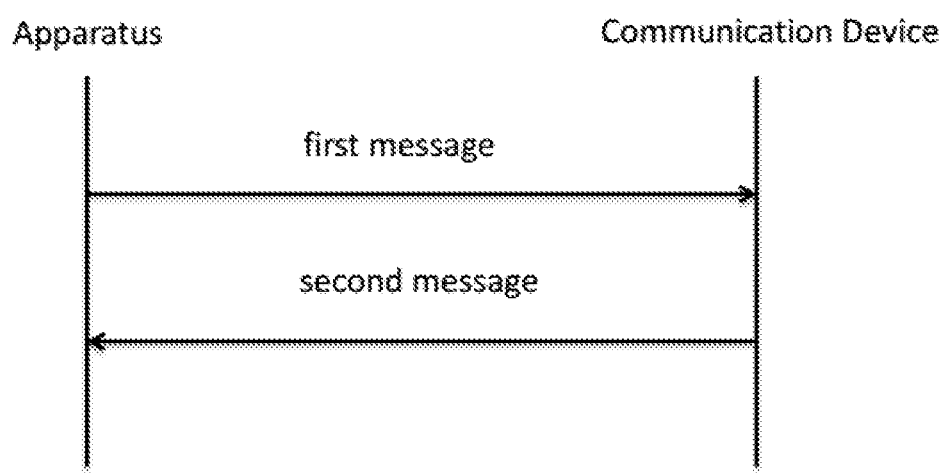
FIG. 4 illustrates communications between an apparatus and a communication device according to an embodiment of the present disclosure.

FIG. 4 depicts communications between an apparatus and a communication device according to an embodiment of the subject application.

In a preferred embodiment, the apparatus comprises a transmitter, that transmits a first message to a communication device, where the first message is a message within a random access procedure; a receiver that receives a second message from the communication device in response to the first message; and a processor that increases a contention window value if the second message is not received in a time duration after the first message is transmitted; and that sets the contention window value to an initial value if the second message is received in the time duration after the first message is transmitted. The manner of setting the contention window value may be similar to that described in Section 4.2.2 of TS 37.213v15.0.0 mentioned above.

For example, the apparatus is an UE, the communication device is a base unit, the first message is Msg 3 and the second message is Msg 4 in the random access procedure. The UE transmits Msg 3, which includes an identification of the UE, to the base unit, and starts ra-ContentionResolutionTimer. The UE then monitors the Physical Downlink Control Channel (PDCCH) until ra-ContentionResolutionTimer expires or is stopped. If the UE receives Msg 4 before the ra-ContentionResolutionTimer expires, the UE considers that the contention resolution is successful, and sets the contention window value $CW_p$ for each priority class $p \in \{1,2,3,4\}$ to the minimum allowed value, namely, set $CW_p = CW_{min,p}$. If the UE does not receive Msg 4 before the ra-ContentionResolutionTimer expires or is stopped, the UE considers that the contention resolution is unsuccessful, and thus increases the contention window value $CW_p$ for each priority class $p \in \{1,2,3,4\}$ to the next higher allowed value. If $CW_p = CW_{max,p}$, the next higher allowed value for adjusting $CW_p$ is still $CW_{max,p}$. Msg 4 may include an identification of the UE in the resource assignment (Downlink Control Information (DCI)) by addressing the UE's Cell-Radio Network Temporary Identifier (C-RNTI), or include the "UE Contention Resolution Identity" in the transport block carried by Msg 4.

In a more detailed example, if the reference Hybrid Automatic Repeat Request (HARQ) ID (HARQ_ID_ref) carries a Msg 3 transmission in reference subframe $n_{ref}$ and the contention resolution is considered unsuccessful in or before the subframe $n_g$ (e.g., an UL grant or Autonomous UL Downlink feedback indication (AUL-DFI) is not received in or before the subframe $n_g$), the contention window value $CW_p$ for each priority class $p \in \{1,2,3,4\}$ is increased to the next higher allowed value. If HARQ_ID_ref carries a Msg 3 transmission in subframe $n_{ref}$ and the contention resolution is considered successful in or before the subframe $n_g$, the contention window value $CW_p$ for each priority class $p \in \{1,2,3,4\}$ is set to the minimum allowed value, namely, set $CW_p = CW_{min,p}$.

In another example, the apparatus in FIG. 4 is a base unit and the communication device in FIG. 4 is an UE. The base unit transmits Msg 2 (i.e., the first message in FIG. 4) to the UE. If the base unit does not receive Msg 3 (i.e., the second message in FIG. 4) in a determined time duration, on any of the resources granted by Msg 2, the base unit considers the contention resolution is unsuccessful, and increases the contention window value $CW_p$ for every priority class $p \in \{1,2,3,4\}$ to the next higher allowed value; otherwise, the base unit sets $CW_p = CW_{min,p}$. As mentioned above, if the procedure is contention-free random access procedure, Msg 2 is a message within the random access procedure while Msg 3 is not; if the procedure is contention-based random access procedure, both Msg 2 and Msg 3 are both messages within the random access procedure.

Assuming that a NACK had been received for the corresponding Msg 2 transmission, the increasing of contention window value $CW_p$ can also be realized. When the base unit transmits a Downlink Control Information (DCI) to request a retransmission of Msg 3, if the base unit does not receive a corresponding Msg 3 retransmission on any of the resources granted by the DCI, the base unit increases the contention window value $CW_p$ for every priority class $p \in \{1,$ 2,3,4$\}$ to the next higher allowed value. Assuming that a NACK had been received for the retransmission request, the increasing of contention window value $CW_p$ can also be realized.

Assuming that an ACK had been received for the corresponding Msg 2 transmission, setting the contention window value $CW_p$ for every priority class $p \in \{1,2,3,4\}$ to the minimum allowed value can also be realized. When the base unit transmits a DCI to request a retransmission of Msg 3, if the base unit receives a corresponding Msg 3 retransmission on at least one of the resources granted by the DCI, the base unit sets the contention window value $CW_p$ for every priority class $p \in \{1,2,3,4\}$ $CW_p = CW_{min,p}$. Assuming that an ACK had been received for the retransmission request, the setting of contention window value $CW_p$ can also be realized.

In another preferred embodiment, an apparatus comprises a receiver that receives a first message from a communication device, where the first message is a message within a random access procedure; a transmitter that transmits a second message to the communication device in response to the first message; and if a processor determines that a contention resolution of a random access procedure is ongoing, keeps a contention window value unchanged or sets the contention window value to an initial value.

For example, the apparatus in FIG. 4 is an UE and the communication device in FIG. 4 is a base unit. The UE receives Msg 2 in subframe $n_g$, where the Msg 2 carries an uplink grant and the contention resolution is ongoing. That is, the ra-ContentionResolutionTimer is still running in subframe $n_g$, and the contention resolution has not been determined as successful nor unsuccessful. In this case, the contention window value is beneficially unmodified, i.e. $CW_p$ remains unchanged. Therefore, the Msg 3 transmission, which is granted by Msg 2, is treated as any other PUSCH transmission for the aspects of channel access. By this way, good fairness to other unlicensed channel contenders is ensured. As mentioned above, if the procedure is contention-free random access procedure, Msg 2 is a message within the random access procedure while Msg 3 is not; if the procedure is contention-based random access procedure, both Msg 2 and Msg 3 are messages within the random access procedure.

In another example, the contention window value $CW_p$ for the priority class p applicable to Msg 3, or to all priority classes $p \in \{1,2,3,4\}$, is set to the minimum value so that $CW_p = CW_{min,p}$. This ensures a statistically faster channel access for Msg 3 transmissions, which is useful to avoid delays that are detrimental to the time-critical uses of random access, such as handover or beam failure in NR systems.

In another preferred embodiment, an apparatus comprises a receiver that receives a first message from a communication device, where the first message is a message within a random access procedure; a transmitter that transmits a second message to the communication device in response to the first message; and a processor that increases a contention window value if the receiver receives a re-transmitted first message from the communication device.

For example, the apparatus in FIG. 4 is an UE and the communication device in FIG. 4 is a base unit. A Msg 3 may be transmitted by the UE in response to a Msg 2 from the base unit. However, if the Msg 2 is re-transmitted by the base unit, it can be deemed that the Msg 3 is not received by the base unit. Thus, the contention window value $CW_p$ may be adjusted accordingly, i.e. increased to the next higher allowed value.

In a detailed embodiment, if an UL grant is received, where the PDCCH is addressed to the UE's Temporary Cell Radio Network Temporary Identifier (C-RNTI), and the contention resolution is ongoing, i.e. the ra-ContentionResolutionTimer is running in subframe $n_g$, the re-transmission of Msg 3 is required. Since the UL grant, which is included in the PDCCH, indicates a retransmission, this implies that the previous transmission could not be successfully received, which may have been caused by a collision on the channel. It is therefore beneficial to increase the contention window value in order to reduce the risk of another collision in the following transmission. In this case, the contention window value $CW_p$ for every priority class $p \in \{1,2,3,4\}$ is increased to the next higher allowed value. As mentioned above, Msg 3 may either be a message within a random access procedure or not.

Figure 5:
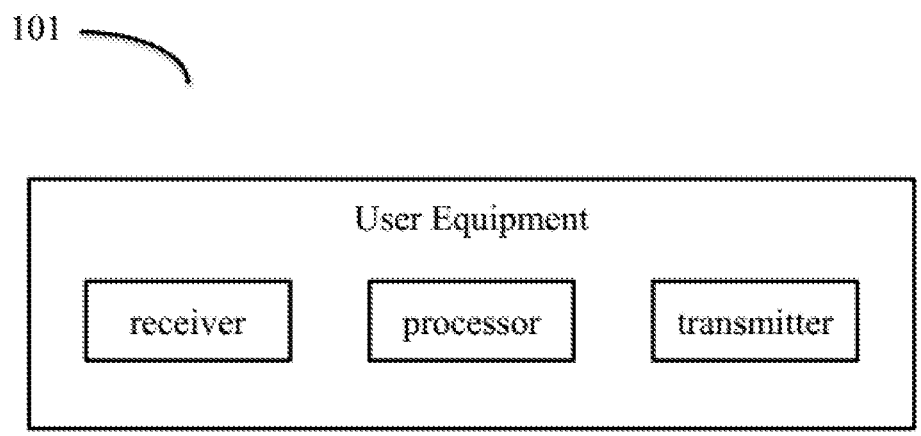
FIG. 5 illustrates an example block diagram of user equipment according to an embodiment of the present disclosure.

FIG. 5 depicts a block diagram of user equipment according to the embodiments of the present disclosure. The user equipment 101 may include a receiver, a transmitter, and a processor. In certain embodiments, the user equipment 101 may further include an input device, a display, a memory, and/or other elements. The functions and implementations of all elements in the user equipment 101 and definitions of related technical terms can refer to the specific descriptions of FIG. 4 and the foregoing corresponding paragraphs in this specification.

Figure 6:
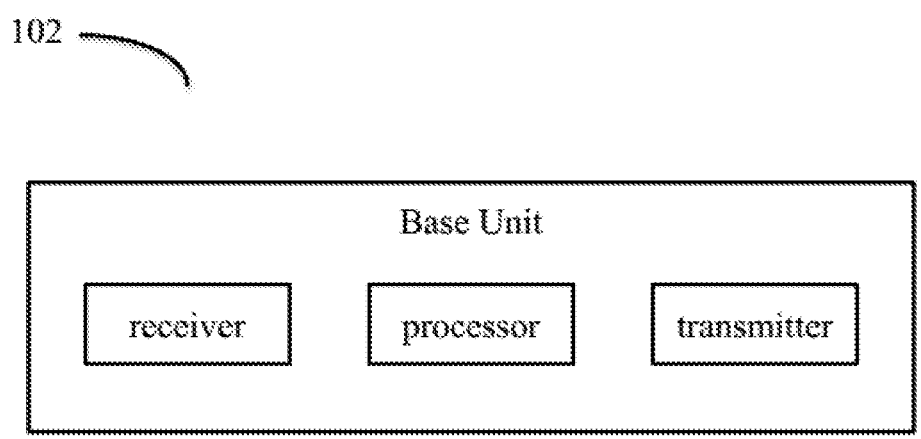
FIG. 6 illustrates an example block diagram of a base unit according to an embodiment of the present disclosure.

FIG. 6 depicts a block diagram of a base unit according to the embodiments of the present disclosure. The base unit 102 may include a receiver, a transmitter, and a processor. In certain embodiments, the base unit 102 may further include an input device, a display, a memory, and/or other elements. The functions and implementations of all elements in the apparatus and definitions of related technical terms can refer to the specific descriptions of FIG. 4 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
   a processor;
   a transmitter for transmitting a first message to a communication device, wherein the first message is a first random access procedure message within a random access procedure, wherein the processor starts a contention resolution timer in response to transmitting the first message; and
   a receiver for receiving a second message from the communication device in response to the first message, wherein the second message is a second random access procedure message within the random access procedure;
   wherein the processor increases a contention window value if the second random access procedure message is not received from the communication device in a time duration after the contention resolution timer starts, and that sets the contention window value to an initial value if the second random access procedure message is received from the communication device in the time duration after the contention resolution timer starts.

2. The apparatus of claim 1, wherein the apparatus is a user equipment, the communication device is a base unit, the first message includes an identification of the user equipment, and the second message is a random access procedure message that includes an identification of the user equipment in the second message resource assignment or in the transport block conveyed by the second message.

3. The apparatus of claim 1, wherein the apparatus is a base unit and the communication device is a user equipment, and the first message includes a random access response.

4. The apparatus of claim 3, wherein the second message is a random access procedure message that includes an identification of the user equipment.

5. The apparatus of claim 1, wherein the time duration is the time while ra-ContentionResolutionTimer is running.

6. An apparatus comprising:
   a receiver for receiving a first message from a communication device, wherein the first message is a first random access procedure message within a random access procedure;
   a transmitter for transmitting a second message to the communication device in response to the first message, wherein the second message is a second random access procedure message within the random access procedure; and
   a processor that increases a contention window value if the receiver receives a re-transmitted first message from the communication device.

7. The apparatus of claim 6, wherein the apparatus is user equipment, the communication device is a base unit, and the first message includes a random access response.

8. The apparatus of claim 7, wherein the second message is a random access procedure message that includes an identification of the user equipment.

9. A method comprising:
    transmitting, by an apparatus, a first message to a communication device, wherein the first message is a first random access procedure message within a random access procedure;
    starting a contention resolution timer in response to transmitting the first message;
    increasing a contention window value if a second message is not received from the communication device in response to the first random access procedure message in a time duration after the contention resolution timer starts, wherein the second message is a second random access procedure message within the random access procedure; and
    setting the contention window value to an initial value if the second random access procedure message is received from the communication device in response to the first message in the time duration after the contention resolution timer starts.

10. The method of claim 9, wherein the apparatus is a user equipment, the communication device is a base unit, the first message includes an identification of the user equipment, and the second message is a random access procedure message that includes an identification of the user equipment in the second message resource assignment or in the transport block conveyed by the second message.

11. The method of claim 9, wherein the apparatus is a base unit and the communication device is a user equipment, and the first message includes a random access response.

12. The method of claim 11, wherein the second message is a random access procedure message that includes an identification of the user equipment.

13. The method of claim 9, wherein the time duration is the time while ra-ContentionResolutionTimer is running.

* * * * *